(12) United States Patent
Kim et al.

(10) Patent No.: US 6,975,048 B2
(45) Date of Patent: Dec. 13, 2005

(54) DRIVE APPARATUS AND XY TABLE UTILIZING THE SAME

(75) Inventors: Houng Joong Kim, Hitachi (JP); Kohji Maki, Hitachi (JP); Hisao Tadokoro, Hitachi (JP); Hideki Shimane, Mito (JP); Hitoshi Shibata, Hitachi (JP); Keijirou Sakai, Kanasago (JP)

(73) Assignee: Hitachi, Ltd., Tokyo (JP)

( * ) Notice: Subject to any disclaimer, the term of this patent is extended or adjusted under 35 U.S.C. 154(b) by 101 days.

(21) Appl. No.: 10/627,777

(22) Filed: Jul. 28, 2003

(65) Prior Publication Data

US 2004/0021373 A1   Feb. 5, 2004

(30) Foreign Application Priority Data

Jul. 31, 2002   (JP) ............................. 2002-222322

(51) Int. Cl.⁷ ........................................... H02K 41/00
(52) U.S. Cl. ...................................................... 310/12
(58) Field of Search ............................... 310/12, 13, 14

(56) References Cited

U.S. PATENT DOCUMENTS 5,925,956 A * 7/1999 Ohzeki ..................... 310/90.5

FOREIGN PATENT DOCUMENTS

JP   11-262237   9/1999   ........ H02K 41/035
JP   2001-28875  1/2001   .......... H02K 41/03

* cited by examiner

Primary Examiner—Darren Schuberg
Assistant Examiner—Judson H. Jones
(74) Attorney, Agent, or Firm—Antonelli, Terry, Stout and Kraus, LLP.

(57) ABSTRACT

A drive apparatus overcomes the problems of ensuring accurate mounting of a plurality of armature coils relative to a plurality of magnetic pole position detectors, limitations concerning the location for mounting, and the extension of primary-side length. The drive apparatus comprises a primary side including an arrangement of a plurality of armatures each having a core made of a magnetic material with coil windings. It also comprises a secondary side including a permanent magnet movably supported relative to the armatures via a gap. A magnetic pole position detector is disposed between adjacent armatures.

10 Claims, 9 Drawing Sheets

EXAMPLE OF π/3 INTERVAL ARRANGEMENT

FIG.4B

EXAMPLE OF 2π/3 INTERVAL ARRANGEMENT

DRIVE APPARATUS AND XY TABLE UTILIZING THE SAME

BACKGROUND OF THE INVENTION

1. Technical Field

The present invention relates to a drive apparatus utilizing electromagnetic force. It also relates to an XY table that uses the drive apparatus as a drive source and that is used in apparatuses for the manufacture of semiconductors, for example.

2. Background Art

JP Patent Publication (Kokai) No. 2001-28875A discloses a drive apparatus used as a drive source in a conventional semiconductor manufacturing apparatus. In this example, a plurality of permanent magnets are disposed on a needle such that their directions of magnetization alternate. A stator includes two kinds of magnetic cores, and a plurality of armatures with coil windings are arranged in series. Another example of the drive apparatus is disclosed in JP Patent Publication (Kokai) No. 11-262237 A (1999), in which, for achieving higher accuracy in needle position control and in order to decrease thrust ripples, a position sensor for detecting the position of the needle is disposed toward the stator.

When a drive apparatus utilizing electromagnetic force is fitted with a magnetic pole position detector to achieve higher position control accuracy and reduce thrust ripples, for example, the overall size of the drive apparatus could become excessively large, possibly limiting the available location for its installation. This problem is particularly relevant in the case of using the drive apparatus as a drive source in apparatuses for manufacturing semiconductor-based electronic devices, for example, which are required to be as compact as possible.

SUMMARY OF THE INVENTION

It is an object of the invention to reduce the size of a drive apparatus fitted with a magnetic pole position detector and that of a manufacturing apparatus utilizing such a drive apparatus as its drive source.

In one feature of the invention, the drive apparatus or the manufacturing apparatus comprises a primary-side member and a secondary-side member. The primary-side member includes a plurality of armatures arranged at predetermined intervals. The secondary-side member includes a plurality of permanent magnets. A position detector is disposed between the multiple armatures.

In another feature of the invention, the drive apparatus comprises a plurality of armatures having a magnetic body with coil windings, and a secondary-side member having a plurality of permanent magnets. The armatures include a first opposing portion and a second opposing portion, each of which includes an upper magnetic pole tooth portion and a lower magnetic pole tooth portion opposing with each other via a gap. A secondary-side member is disposed between the gaps of the first and the second opposing portions. The multiple armatures are arranged at predetermined intervals, and a position detector is disposed between them.

In yet another feature of the invention, the drive apparatus comprises a plurality of armatures including a first and a second core. The first core includes a first opposing portion and a magnetic body. The second core includes a second opposing portion and a magnetic body. Each opposing portion includes an upper magnetic pole tooth portion and a lower magnetic pole tooth portion that are disposed opposite each other. A secondary-side member is disposed between a gap in each of the first and the second opposing portions, such that the upper magnetic pole tooth of the first core and that of the second magnetic unit are alternately disposed above the secondary-side member, and that the lower magnetic pole tooth of the first core and that of the second core are alternately disposed below the secondary-side member. A coil is commonly wound around the first and the second cores. A position detector is disposed between the multiple armatures.

Thus, in accordance with the invention, because the position detector for minimizing thrust ripples is disposed in the space between the multiple armatures, an increase in the size of the drive apparatus or the manufacturing apparatus can be prevented.

Other features of the invention are described in the appended claims.

DESCRIPTION OF PREFERRED EMBODIMENTS

This application is based on the Japanese patent application, 2002-222322, filed on Jul. 31, 2002, all the contents of which is incorporated in this patent application.

Figure 5:
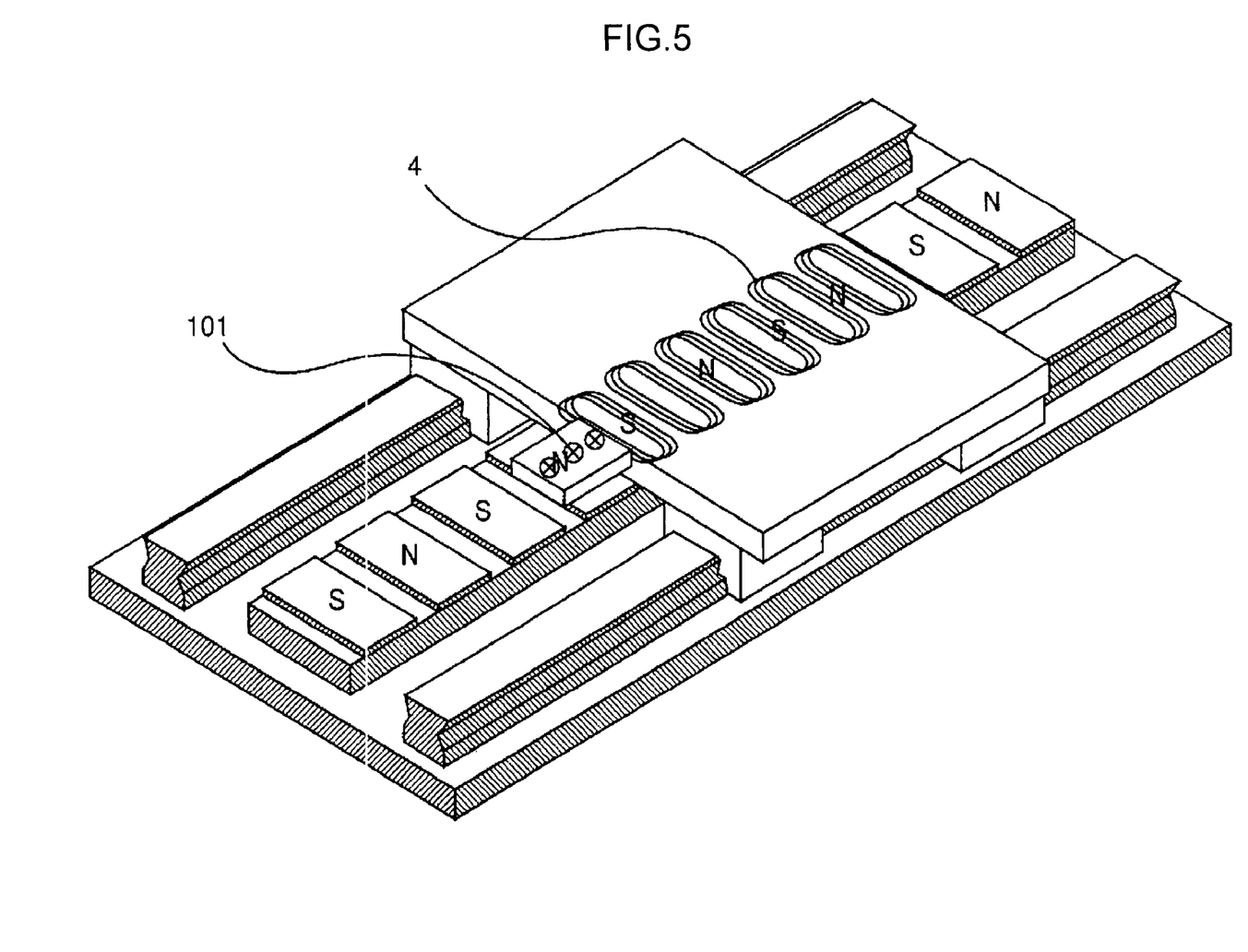
FIG. 5 shows a view illustrating the arrangement of the magnetic pole position detector in the drive apparatus in a comparative example.

FIG. 5 shows a drive apparatus in a comparative example. A magnetic pole position detector 101 is disposed at a position n times the pole pitch away from the effective conductor portion of an armature coil 4. In this comparative example, the overall length of the armature has to be extended in a drive direction to the same degree as the length of the magnetic pole position detector 101. Further, the magnetic pole position detector 101 could be damaged should it hit an obstacle during operation.

Figure 1:
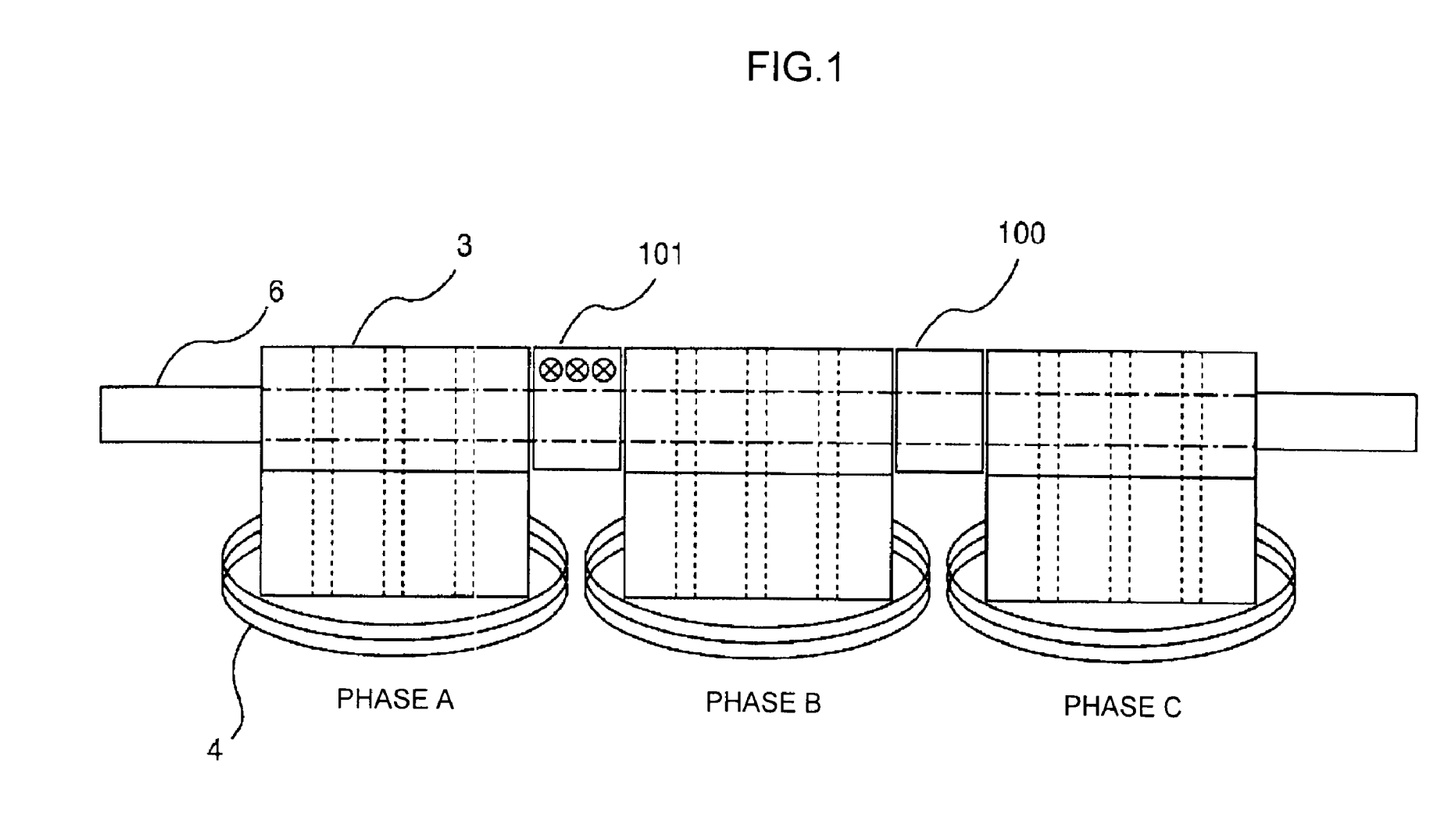
FIG. 1 shows an overall view of an embodiment of the invention.

FIG. 1 is an overall view of the drive apparatus according to an embodiment of the invention. An armature coil 4 made of a conductor is wound around each of a plurality of armatures 3 that are arranged in series, thus making up a primary-side member. A secondary-side member 6 is movably supported with bearings or the like in a gap of the armatures 3, otherwise designated as the primary-side member. While in the present embodiment the primary-side member is fixed and the secondary-side member moves, the secondary-side member may be fixed while allowing the primary-side member to move. Predetermined spacings are provided between adjacent armatures 3 so that thrust ripples can be minimized and higher position control accuracy can be achieved. The spacings are ensured by spacers 100 fitted between the adjacent armatures 3. A magnetic pole position detector 101 is mounted on each of the spacers 100. The magnetic pole position detector 101 is thus disposed in the space provided between the adjacent armatures 3 for the purpose of minimizing thrust ripples, for example, that could be caused by positional changes. As a result, the length of the drive apparatus in the drive direction can be shortened, and the overall size of the drive apparatus can be reduced. Further, damage to the magnetic pole position detector can be prevented by preventing the collision of the magnetic pole position detector with external obstacles.

Figure 2A:
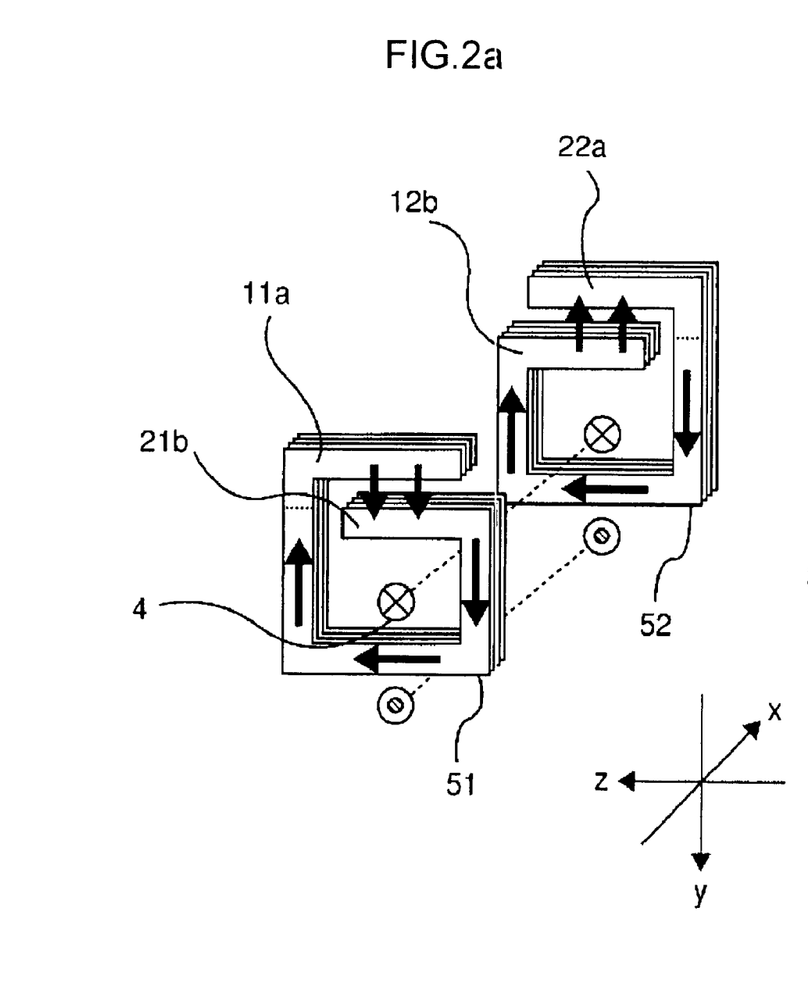
FIGS. 2a and 2b show the structure of a drive apparatus used in the embodiment of the invention.
Figure 2B:
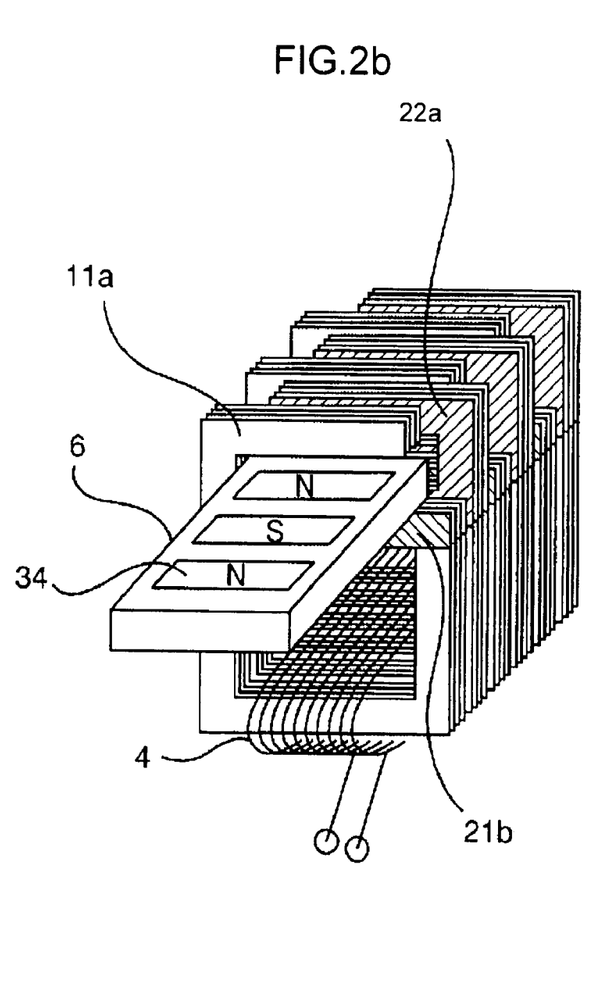

FIGS. 2a and 2b show the drive apparatus according to the embodiment. FIG. 2(*a*) shows the flow of magnetic flux in the drive apparatus. FIG. 2(*b*) is an overall view of the drive apparatus. A plurality of permanent magnets 34 are arranged such that the N and S poles alternate, thus making up the secondary-side member 6 of the drive apparatus. The armature 3 corresponds to the primary-side member (including magnetic elements with coil windings) of the drive apparatus, and is made up of cores 51 and 52 and an armature coil 4.

The cores 51 and 52 are made of a magnetic material and are constructed such that their upper and lower magnetic poles are alternately arranged. An upper magnetic pole tooth 11a and a lower magnetic pole tooth 21b of the core 51 are defined as a first opposing portion. A lower magnetic pole tooth 12b and an upper magnetic pole tooth 22a of the core 52 are defined as a second opposing portion. Thus, the armature 3 is arranged such that a (2n−1)th core has a first opposing portion while a (2n)th core has a second opposing portion (n=1, 2, 3, . . . ). A predetermined gap is provided between the upper magnetic pole tooth and the lower magnetic pole tooth of each opposing portion of the cores 51 and 52. The secondary-side member 6 is passed through the gap, such that the secondary-side member 6 is disposed between the first and second opposing members. As a single-phase AC current is passed through the coil 4 in accordance with the relative positions of the secondary-side member 6 and the armature 3, magnetic fluxes pass through the gap between the upper and lower magnetic pole tooth of each of the opposing portions of the drive apparatus in alternating directions, with the fluxes flowing in the first and second opposing portions alternately reversed. The fluxes flowing in the first and the second opposing portions interact with the magnetic flux created by the permanent magnet 34 to create an electromagnetic driving force in the secondary-side member 6 in an x-direction.

Figure 3:
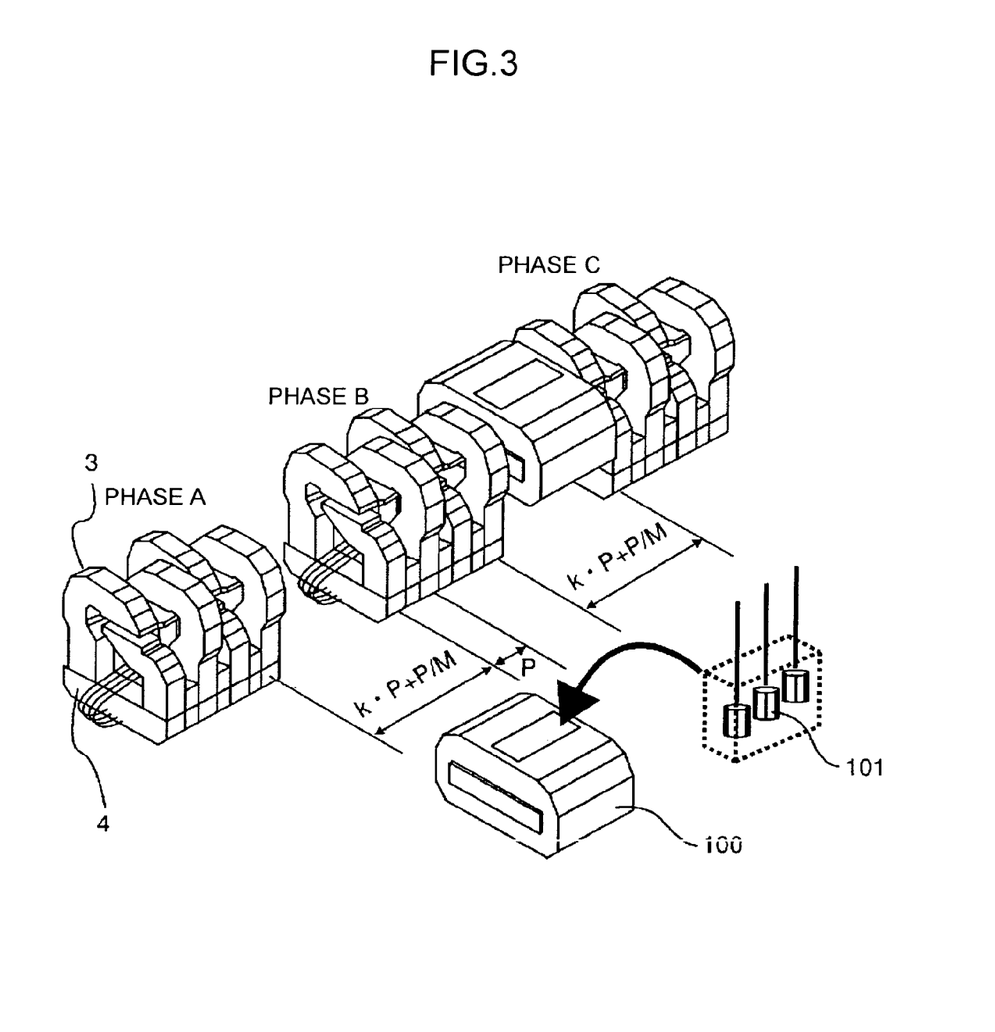
FIG. 3 shows a view (No. 1) illustrating an arrangement of the magnetic pole position detector according to the invention.

FIG. 3 shows an example of the arrangement of the magnetic pole position detector. As mentioned above, in order to reduce the thrust ripples in operation, the spacers 100 must be provided between the centers of the magnetic pole teeth of the adjacent armatures to thereby ensure predetermined intervals (k·P+P/M), wherein k=0, 1, 2, 3, . . . ; P=magnetic pole pitch; and M=number of phases. By incorporating the magnetic pole position detector 101 into the spacer 100, an increase in the size of the drive apparatus can be prevented and thus a compact drive apparatus can be provided, while advantageously protecting the magnetic pole position detector from external obstacles.

The magnetic pole position detector 101 shown in FIG. 3 includes magnetic pole position detector portions such as Hall elements or Hall ICs, and it refers to a three-phase magnetic pole position detector unit.

Figure 4A:
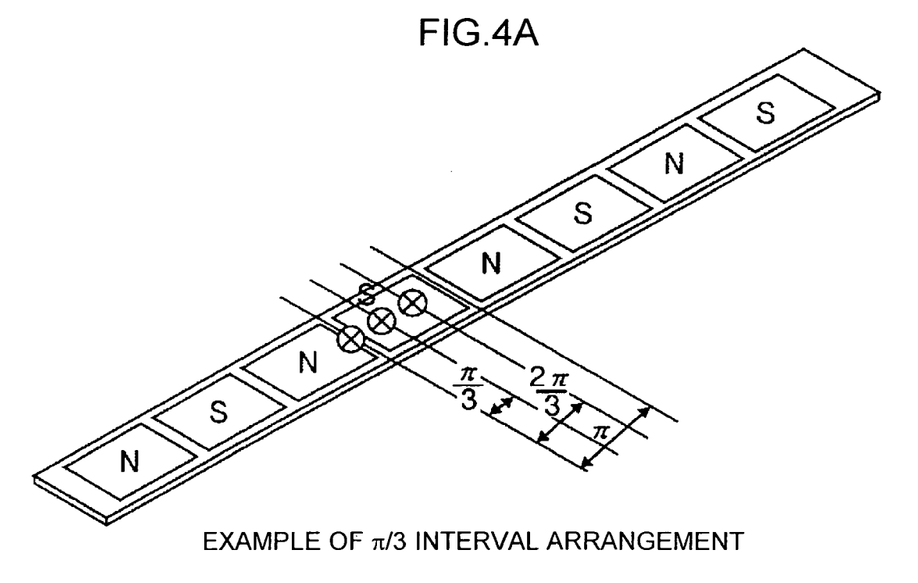
FIGS. 4A and 4B show other views (No. 2) illustrating the arrangement of the pole-position detector according to the invention.
Figure 4B:
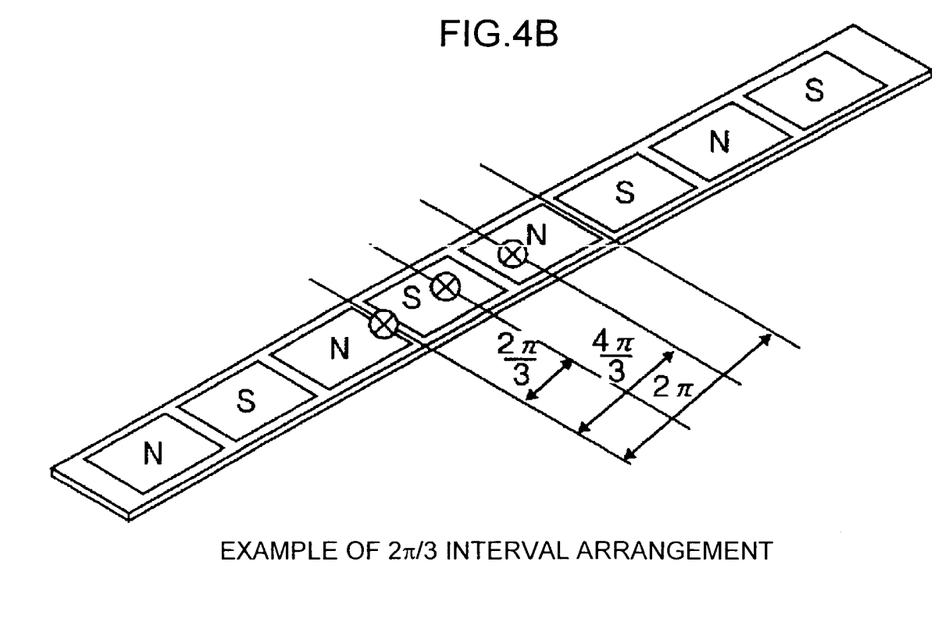

FIGS. 4A and 4B show examples of the intervals of arrangement of the magnetic pole position detectors for individual phases. FIG. 4(A) shows an example in which the magnetic pole position detector portions are arranged at π/3 (which is roughly P/6, when the magnetic pole pitch is P) in a three-phase drive apparatus. FIG. 4(B) is an example in which the magnetic pole position detectors 101 are arranged at roughly 2π/3 (roughly P/3) intervals.

By providing appropriate intervals (k·P+P/M, wherein k=0,1,2,3, . . . ; P=magnetic pole pitch; and M=number of phases) between the magnetic pole tooth centers of the adjacent armatures with the spacers 100, a two- or five-phase drive apparatus can be realized.

It goes without saying that the magnetic pole detectors mounted on a two- or five-phase drive apparatus can also provide similar advantageous effects by being arranged at roughly π/M or 2π/M (where M is the number of phases) intervals.

Regarding a method of fitting the spacer 100 with the magnetic pole position detector 101, the advance angle of current supply by the control circuit can be corrected in accordance with the deviation of the magnetic pole center of the primary-side member made up of the armatures 3 from the magnetic pole center of the permanent magnet in the secondary-side member 6. By doing so, the positional limitations concerning the detection of the magnetic pole positions can be minimized. Specifically, it becomes possible to reduce thrust ripples by means of the control circuit without necessarily setting the intervals between adjacent armatures at k·P+P/M, as described above.

Figure 6:
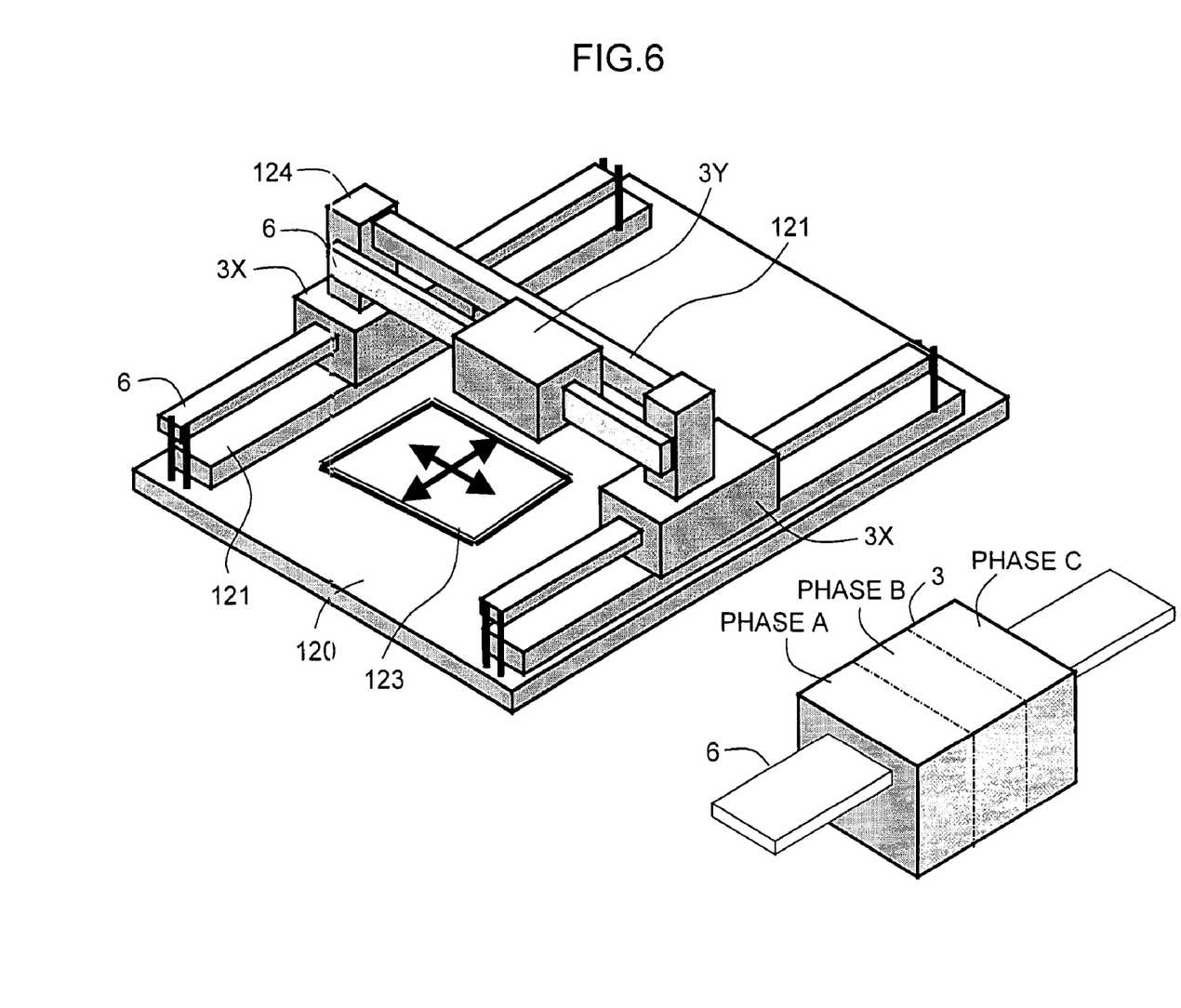
FIG. 6 shows an overall view of an embodiment of an XY table utilizing the drive apparatus of the invention.

FIG. 6 shows an overall view of an XY table utilizing the drive apparatus according to the invention. An armature 3 constitutes a three-phase drive apparatus made up of a combination of three armatures shown in FIG. 1, namely armatures for phases A, B, and C. Between the individual phases are provided the spacer 100. The magnetic pole position detector 101 is provided in the spacer 100. In FIG. 6, reference 3X designates an armature 3 in an X-direction drive apparatus, while reference 3Y designates an armature 3 in a Y-direction drive apparatus. A linear guide mechanism 121 (linear bearings) is mounted on a base 120 of the XY table so that the armature 3X of the X-direction drive apparatus can be freely moved. Likewise, another linear guide mechanism 121 (linear bearings) 121 is mounted so that the armature 3Y of the Y-direction drive mechanism can be freely moved along the Y-axis. Another XY stage 123 that can be driven in X- or XY-directions may be mounted on the base 120 and the work can be fastened on the stage, so that finer movements of the work can be obtained.

Figure 11:
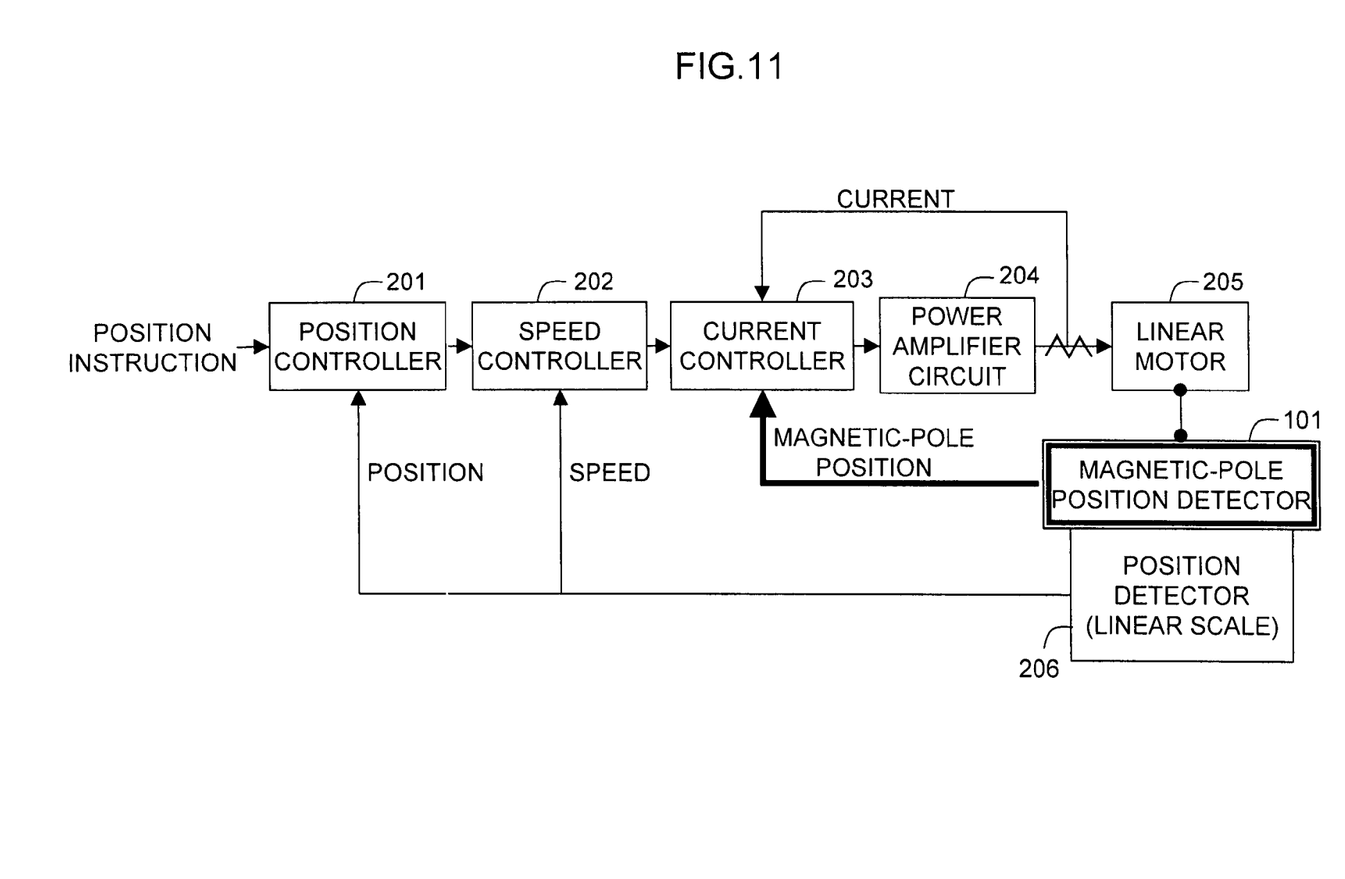
FIG. 11 shows a block diagram of a position control system utilizing the drive apparatus of the invention.

FIG. 11 shows a block diagram of a linear-motor position control system. A linear motor refers to a combination of the armature 3 and the secondary-side member 6, which constitutes the drive apparatus according to the invention. Likewise, a magnetic pole detector refers to the magnetic pole position detector 101 disposed between the individual phases of the armature 3 shown in FIG. 1.

The magnetic pole position obtained by the magnetic pole position detector 101 is fed back to a current controller 203, so that the magnetic pole position can be controlled to maintain a predetermined load angle without causing synchronization error as a result of load fluctuations. With regard to the positional displacement of the armature 3 relative to the secondary side 6 in the travel direction, a position detector (linear scale) 206 provides information that is processed as a speed signal and a position signal that are then fed back to a speed controller 202 and a position controller 201, respectively. Based on signals from the speed controller 202 and the position controller 201 and their current values, a current value to be achieved by the current controller 203 is calculated. The output of a power amplifier circuit 204 is then controlled to assume the calculated current value.

Figure 7:
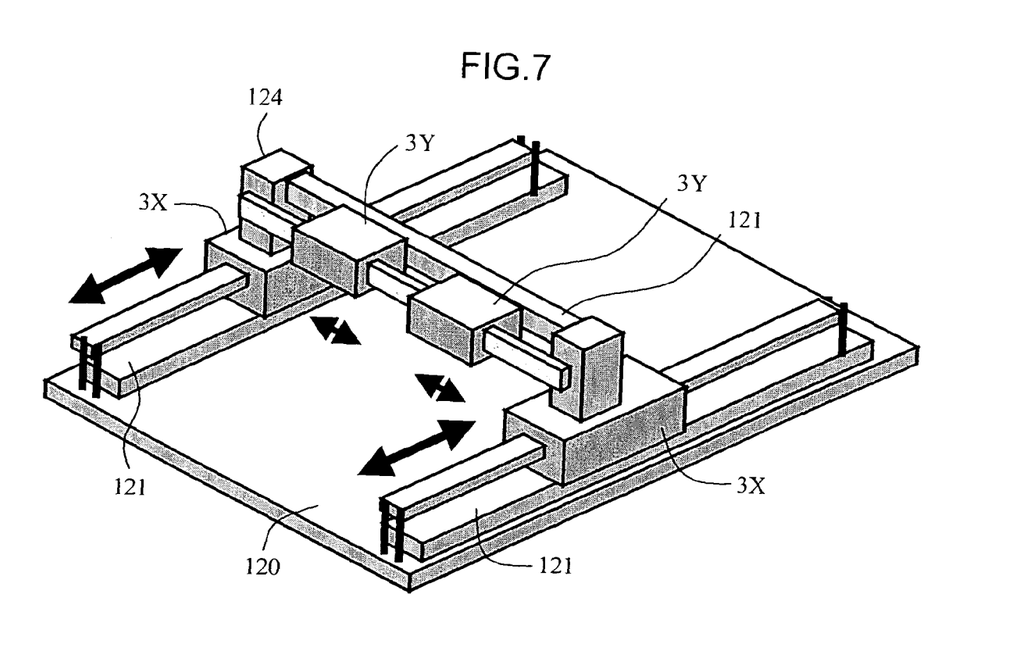
FIG. 7 shows an overall view (No. 1) of another embodiment of the XY table utilizing the drive apparatus of the invention.

FIG. 7 shows an overall view of another embodiment of the XY table utilizing the drive apparatus according to the invention. In this embodiment, a plurality (two in FIG. 7) of armatures 3Y of the Y-direction drive apparatus are employed. By commonly using the secondary-side member 6 in the two armatures 3Y of the Y-direction drive apparatus, the size of the apparatus can be reduced.

Figure 8:
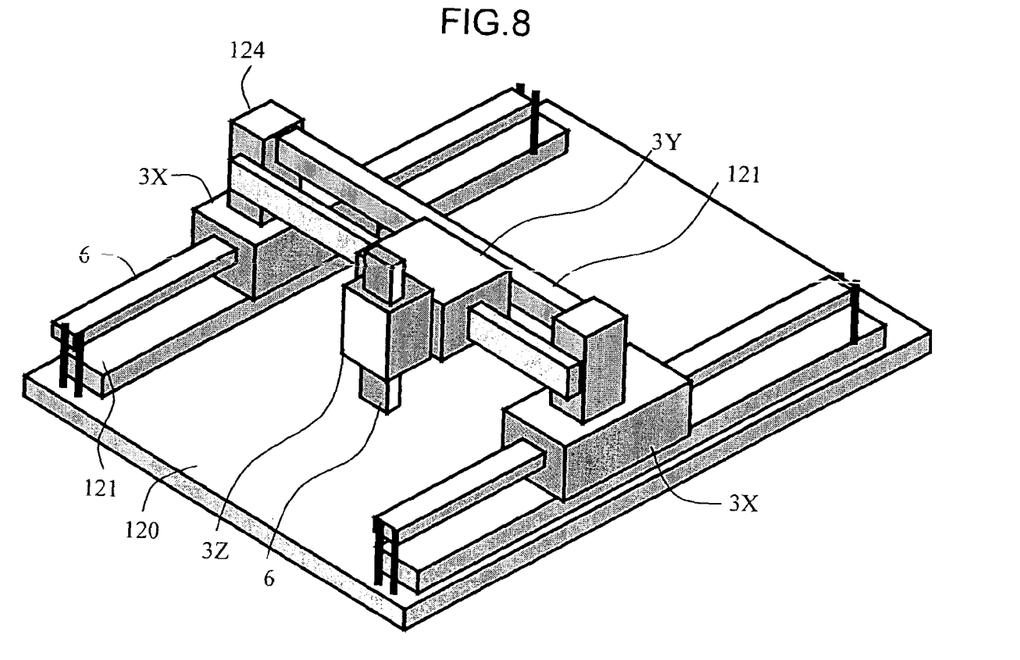
FIG. 8 shows an overall view (No. 2) of an embodiment of an XYZ table utilizing the drive apparatus of the invention.

FIG. 8 shows an overall view of an XYZ table utilizing the drive apparatus according to the invention. In this example, an armature 3Z of a Z-axis direction drive apparatus is mounted on the armature 3Y of the Y-direction drive apparatus, so that the secondary-side member 6 can be vertically moved. Of course, the Z-axis direction drive apparatus can be modified such that the armature 3Z is allowed to move vertically while fixing the secondary-side member 6.

Figure 9:
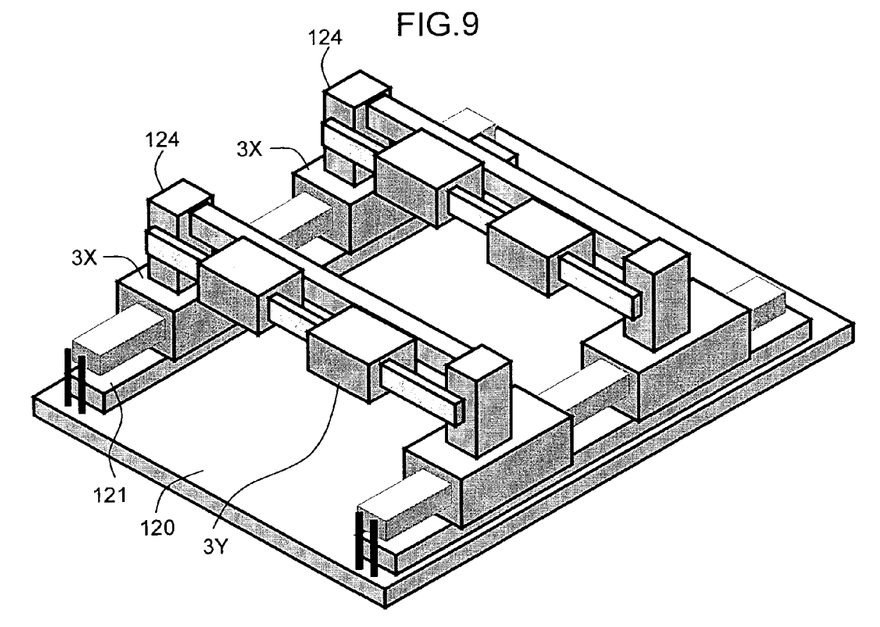
FIG. 9 shows an overall view (No. 3) of another embodiment of the XYZ table utilizing the drive apparatus of the invention.

FIG. 9 shows an overall view of another embodiment of the XY table utilizing the drive apparatus according to the invention. In this example, multiple (two pairs in FIG. 9) pairs of gantries 124 as shown in FIG. 7 are prepared so as to allow for the use of multiple axles.

Figure 10:
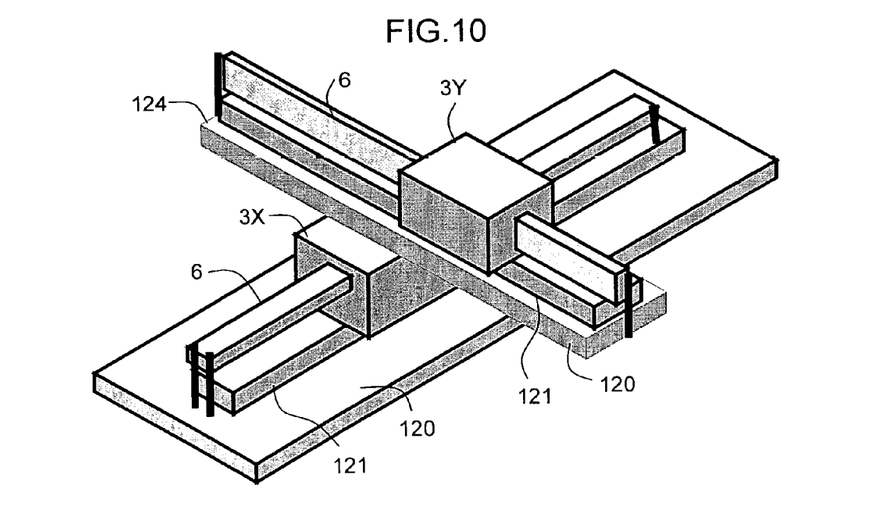
FIG. 10 shows an overall view (No. 4) of another embodiment of the XYZ table utilizing the drive apparatus of the invention.

FIG. 10 shows an overall view of another embodiment of the XY table utilizing the drive apparatus according to the invention. In this example, a one-axle basic unit comprises the linear guide mechanism 121 (linear bearing) and the secondary-side member 6 that are securely mounted on the base 120 in parallel, so that the armature 3 can be freely driven. This basic unit is combined with another basic unit such that they are roughly perpendicular to each other. The Y-direction drive apparatus is securely mounted on the armature 3X of the X-axis direction drive apparatus.

The magnetic pole position detector according to the invention can be applied not only to the drive apparatus as described above but also to any drive apparatus comprising a plurality of armatures in which spacings are provided therebetween. The structures of the drive apparatus as described above can be particularly effectively applied to XY tables used in apparatuses for manufacturing semiconductor electronic devices for which reduction in size is a pressing matter.

Thus, in accordance with the invention, the size of the magnetic pole position detector in the drive apparatus and XY tables can be reduced.

What is claimed is:

1. A drive apparatus comprising:
    a primary-side member including a plurality of armatures with coil windings and a magnetic body; and
    a secondary-side member including a plurality of permanent magnets, wherein
the armatures include a first opposing portion and a second opposing portion, each opposing portion having an upper magnetic pole tooth portion and a lower magnetic pole tooth portion opposing each other via a gap, wherein the secondary-side member is disposed in the gap of the first opposing portion and that of the second opposing portion wherein the multiple armatures are disposed at predetermined intervals, and a position detector is disposed between the multiple armatures.

2. The drive apparatus according to claim 1, wherein the intervals of the armatures are approximately k×P+P/M (k is 0,1,2,3, . . . ), wherein P is the magnetic pole pitch of the armatures, and M is the number of phases of the drive apparatus.

3. The drive apparatus according to claim 1, wherein the position detector comprises a plurality of position detecting elements, and wherein the intervals at which the multiple position detector elements are disposed are approximately P/6 or P/3, wherein P is the magnetic pole pitch of the secondary-side member.

4. An XY table utilizing the drive apparatus according to claim 1 as the drive source.

5. A drive apparatus comprising:
    a plurality of armatures comprising a first core and a second core, the first core having a first opposing portion and a magnetic body, the second core having a second opposing portion and a magnetic body, wherein each opposing portion includes an upper magnetic pole-tooth portion and a lower magnetic pole-tooth portion opposed to one another; and
    a secondary-side member disposed in a gap between each of the first and the second opposing portions, wherein
    the upper magnetic pole tooth portion of the first core and the upper magnetic pole portion of the second core are alternately disposed above the secondary-side member,
    the lower magnetic pole tooth portion of the first core and the lower magnetic pole tooth portion of the second core are alternately disposed below the secondary-side member,
    a coil is wound commonly around the first and the second core, and
    a position detector is disposed between the multiple armatures.

6. A drive apparatus comprising:
    a primary-side member including a plurality of armatures with coil windings and a magnetic body; and
    a secondary-side member including a plurality of permanent magnets;
wherein the multiple armatures are arranged at predetermined intervals and the secondary-side member is arranged in the primary-side member with a gap;
    wherein a position detector is disposed between the multiple armatures; and
    wherein the intervals of the armatures are approximately k×P+P/M (k is 0,1,2,3, . . . ), wherein P is the magnetic pole pitch of the armatures, and M is the number of phases of the drive apparatus.

7. The drive apparatus according to claim 5, wherein the intervals of the armatures are approximately k×P+P/M (k is 0,1,2,3, . . . ), wherein P is the magnetic pole pitch of the armatures, and M is the number of phases of the drive apparatus.

8. The drive apparatus according to claim 5, wherein the position detector comprises a plurality of position detecting elements, and wherein the intervals at which the multiple position detector elements are disposed are approximately P/6 or P/3, wherein P is the magnetic pole pitch of the secondary-side member.

9. An XY table utilizing the drive apparatus according to claim 5 as the drive source.

10. A drive apparatus comprising:
- a primary-side member including a plurality of armatures with coil windings and a magnetic body; and
- a secondary-side member including a plurality of permanent magnets;

wherein the multiple armatures are arranged at predetermined intervals and the secondary-side member is arranged in the primary-side member with a gap;

wherein a position detector is disposed between the multiple armatures; and wherein the position detector comprises a plurality of position detecting portions, and wherein the intervals at which the multiple position detector portions are disposed are approximately P/6 or P/3, wherein P is the magnetic pole pitch of the secondary-side member.

* * * * *